(12) United States Patent
Junqueira et al.

(10) Patent No.: US 11,755,544 B1
(45) Date of Patent: Sep. 12, 2023

(54) PROCESSING CONTINUOUSLY GENERATED DATA USING A ROLLING TRANSACTION PROCEDURE

(71) Applicant: EMC IP Holding Company LLC, Hopkinton, MA (US)

(72) Inventors: Flavio Junqueira, Barcelona (ES); Shivesh Ranjan, Pune (IN); Andrei Paduroiu, Bellevue, WA (US); Tom Kaitchuck, Portland, OR (US)

(73) Assignee: EMC IP Holding Company LLC, Hopkinton, MA (US)

( * ) Notice: Subject to any disclaimer, the term of this patent is extended or adjusted under 35 U.S.C. 154(b) by 415 days.

(21) Appl. No.: 16/864,850

(22) Filed: May 1, 2020

(51) Int. Cl.
| | | |
|---|---|---|
| *G06F 16/00* | (2019.01) | |
| *G06F 16/18* | (2019.01) | |
| *G06F 16/17* | (2019.01) | |
| *G06F 11/30* | (2006.01) | |
| *G06F 9/50* | (2006.01) | |
| *G06F 16/2455* | (2019.01) | |

(52) U.S. Cl.
CPC ........ *G06F 16/1865* (2019.01); *G06F 9/5027* (2013.01); *G06F 11/3034* (2013.01); *G06F 16/1734* (2019.01); *G06F 16/24568* (2019.01)

(58) Field of Classification Search
CPC ................ G06F 2201/84; G06F 21/44; G06F 2201/815; G06F 11/1466; G06F 16/27; G06F 11/1464; G06F 16/2358; G06F 16/2379; G06F 21/31; G06F 11/1451; G06F 16/128; G06F 11/1415; G06F 11/1448; G06F 15/8007; G06F 2201/82; G06F 9/30043; G06F 9/3834; G06F 9/3887; G06F 9/45533; G06F 9/467; G06F 11/1461; G06F 11/1469; G06F 11/1474; G06F 16/10; G06F 16/152; G06F 16/182; G06F 16/188; G06F 16/20; G06F 16/2308; G06F 16/2322; G06F 16/2455; G06F 16/24568; G06F 2201/80; G06F 2201/81; G06F 3/0619; G06F 3/065; G06F 3/0671; G06F 7/14; G06F 7/32

See application file for complete search history.

(56) References Cited

U.S. PATENT DOCUMENTS

| | | | |
|---|---|---|---|
| 2018/0332087 A1* | 11/2018 | Paduroiu | ............ H04N 21/8458 |
| 2018/0332088 A1* | 11/2018 | Kaitchuck | ............... H04L 65/70 |
| 2018/0332367 A1 | 11/2018 | Kaitchuck et al. | |
| 2021/0263937 A1* | 8/2021 | Danilov | .................... G06F 7/14 |

OTHER PUBLICATIONS

"Proposal for rolling transaction in Pravega" [https://github.com/pravega/pravega/wiki/PDP-24:-Rolling-Transaction] retrieved May 22, 2019, 7 pages.

* cited by examiner

*Primary Examiner* — Yicun Wu
(74) *Attorney, Agent, or Firm* — Amin, Turocy & Watson, LLP

(57) ABSTRACT

Processing of continuously generated data using a rolling transaction procedure is described. For instance, a system can process a data stream comprising a first segment and a second segment. A transaction associated with the data stream can be initiated and in response to the transaction being initiated, a first transaction segment for the first segment and a second transaction segment for the second segment are generated. Further, a scaling event that modifies the second segment into a third segment and a fourth segment can be detected, and a data stream transaction procedure is executed to end the transaction.

20 Claims, 10 Drawing Sheets

PROCESSING CONTINUOUSLY GENERATED DATA USING A ROLLING TRANSACTION PROCEDURE

TECHNICAL FIELD

The disclosed subject matter relates to data stream processing and, more particularly, to processing continuously generated data using a rolling transaction procedure.

BACKGROUND

Users of stream processing technologies typically rely on applications that generate insights out of data produced by sources such as sensors, servers, and end users. The volume of data and the requirement of producing insights with low latency from the data generation to the output raises several technical challenges to the underlying software infrastructure. One such challenge is the ability to accommodate ever-changing incoming data traffic and fluctuations in the amount of data expected to be generated by such applications. Many applications also expect consistency guarantees, e.g., that as set of events in is ingested atomically. Atomically ingesting events calls for transactional semantics, e.g., a combination of scaling and transactions. Scaling requires that system changes the amount of resources given to an application over time. Transaction requires that data is ingested atomically despite resource change. There is a natural tension between the two because transactions require the knowledge of the set of resources to commit data against, whereas scaling changes the set of resources dynamically.

The above-described background relating to stream processing is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
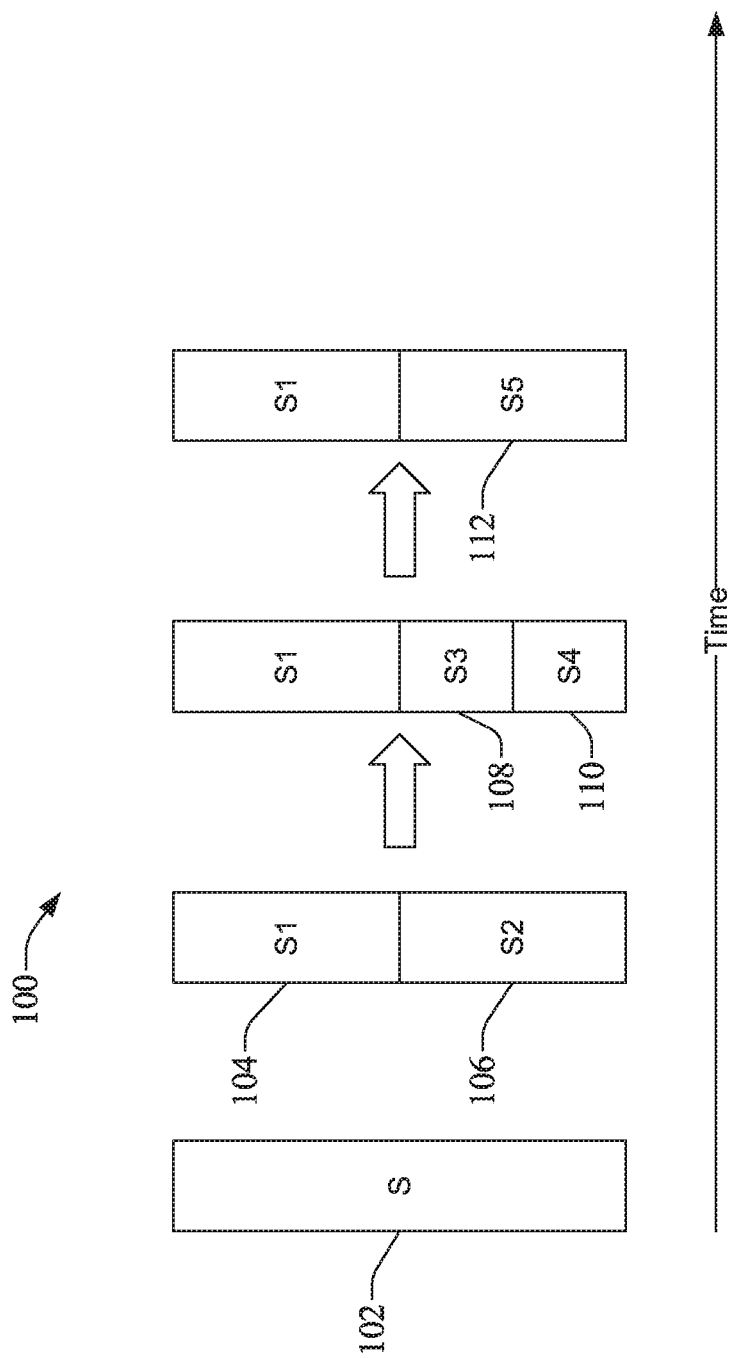
FIG. 1 illustrates a non-limiting example of a scaling process 100 in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate processing continuously generated data using a rolling transaction procedure. As used herein, the terms "Stream" or "Pravega" refer to implementation of a new storage primitive. A stream is ideally suited to the continuous processing of unbounded data. In some embodiments, a stream may be a name, durable, append-only and unbounded sequence of bytes.

Pravega is a system designed to store continuously generated data. The primitive that Pravega exposes for storing data is the stream. Applications of Pravega ingest events by writing to a stream and consume data by reading from the stream. A stream comprises a set of parallel append only segments that can change over time. Such changes to the number of segments are induced by fluctuations to the incoming workload. The segments of the stream are assigned key ranges, satisfying the following: the union of all the key ranges must cover the interval of real numbers between 0.0 and 1.0, and no two intervals overlap. Each written event is associated to a routing key, which Pravega uses to the event to a segment when writing it to the stream.

According to an embodiment, a system comprises a control plane having artificial intelligence that determines amount of workload on a stream (e.g., number of read and write performed on the steam) and determines if the stream should be scaled. For example, the control plane observes the traffic of a stream and determines that the stream needs to be scaled (e.g., split) when a scaling criterion is satisfied. If determined that the stream is required to be split, the control plane splits the stream in two segments, thereby changing the form of the stream that gets processed going forward. If the workload drops, the system can merge the segments back. Various components, listed in FIG. 10 (discussed below) can be utilized to carry out the splitting and merging the segments, including generating and merging the transaction segments (discussed below).

According an embodiment, a system can comprise a processor and a memory that stores executable instructions that, when executed by the processor, facilitate performance of operations comprising processing a data stream comprising a first segment and a second segment. The system can further facilitate starting a transaction associated with the data stream. The system can further facilitate in response to the starting the transaction, creating a first transaction segment associated with the first segment and a second transaction segment associated with the second segment. The system can further facilitate detecting a scaling event that modifies the second segment into a third segment and a fourth segment and facilitate executing a data stream transaction procedure to end the transaction.

According to another embodiment, described herein is a method that can comprise processing, by a device comprising a processor, a data stream comprising a first segment and a second segment. The method can further comprise initiating, by the device, a transaction associated with the data stream. The method can further comprise in response to the initiating the transaction, generating, by the device, a first transaction segment for the first segment and a second transaction segment for the second segment. The method can further comprise detecting, by the device, a scaling event that modifies the second segment into a third segment and a fourth segment, and executing, by the device, a data stream transaction procedure to end the transaction.

According to yet another embodiment, a device can comprise a processor and a memory that stores executable instructions that, when executed by the processor, facilitate performance of operations comprising processing a data stream comprising a first segment and a second segment. The device can further comprise starting a transaction associated with the data stream. The device can further comprise in response to the starting the transaction, creating a first transaction segment associated with the first segment and a second transaction segment associated with the second segment. The device can further comprise detecting a scaling event that modifies the second segment into a third segment and a fourth segment, and executing a commit request for the transaction, wherein the executing the commit request comprises executing a data stream transaction procedure to end the transaction.

These and other embodiments or implementations are described in more detail below with reference to the drawings. Repetitive description of like elements employed in the figures and other embodiments described herein is omitted for sake of brevity.

FIG. 1 illustrates a non-limiting example of a scaling process 100 in accordance with various aspects and embodiments of the subject disclosure. In one or more embodiments, a stream S 102 starts with two segments S1 104 and S2 106. For example, if the workload of the segment 2 106 increases, then system splits segment S2 106 in two new segments S3 108 and S4 110 and increases overall number of segments from two to three: {S1, S2}→{S1, S3, S4}. The system can also decrease the number of segments if the workload decreases. If the volume of data for segments S3 108 and S4 110 drops, then the system reduces the number of segments back to two by combining segments S3 108 and S4 110 into new segment S5 112 (e.g., {S1, S3, S4→S1, S51}).

The decision to scale an individual segment up or down depends upon the recent history of the segment, and the state of its neighbors in the key interval for mergers. Segments report regularly the amount of traffic they are receiving and are considered for scaling accordingly. Once there is a decision by the control plane to scale the stream, it seals (no further writes are accepted) the segments that are being called and creates new segments accordingly. To represent the progression of the segments sets, the control plane uses the concept of epoch. Upon every scaling, it associates the new segment set to an epoch, and the epoch is identified by a strictly increasing counter. The epoch identifiers establish a total order on the sequence of epochs and consequently of scaling events. As illustrated in FIG. 1, {S1, S2} corresponds to the segment set of epoch 1, while {S1, S3, S4} corresponds to the segment set of epoch 2.

In addition to the ability of scaling streams according to incoming write traffic, the system offers the options to write a sequence of events atomically. These events can have distinct routing keys, and as such, they might be written to different segments. When an application begins a transaction, the system collects written events and keeps them in temporary segments that are to be merged to the main stream segments upon a call to commit or discarded upon a call to abort. For each open stream segment, it creates a temporary transaction segment, giving a one-to-one correspondence between temporary transaction segments and stream open segments.

The process of merging upon commit works naturally in the absence of scaling because it corresponds to concatenating the transaction segments to the tail of the stream segments. However, if the stream scales, then the one-to-one mapping breaks and directly concatenating segments is no longer an option.

Figure 2:
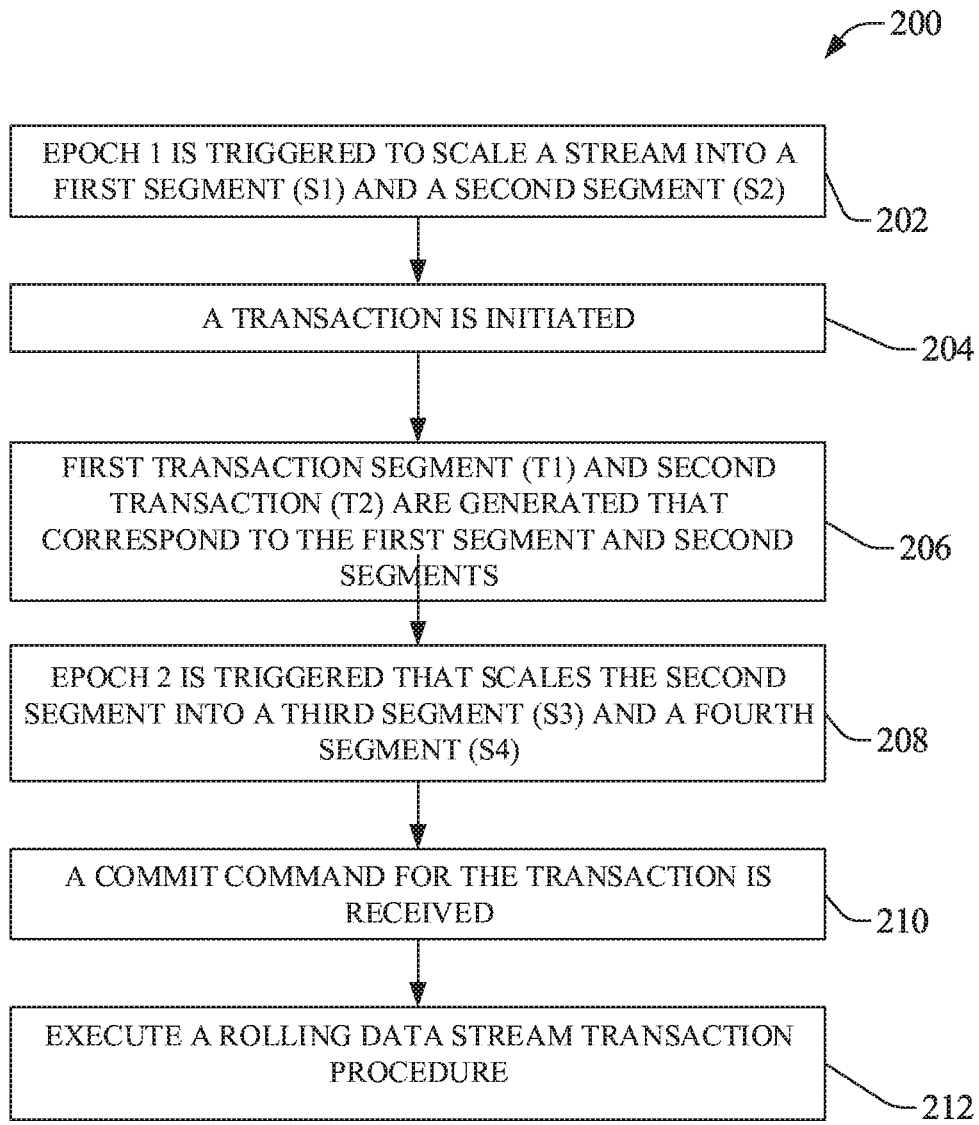
FIG. 2 illustrates flow diagram of an example, non-limiting system 200 that facilitates processing continuously generated data using a rolling transaction procedure in accordance with one or more embodiments described herein.

FIG. 2 illustrates flow diagram of an example, non-limiting system 200 that facilitates processing continuously generated data using a rolling transaction procedure in accordance with one or more embodiments described herein. At 202, an epoch 1 is triggered to scale a stream into two segments, a first segment (S1) and a second segment (S2). At 204 a transaction is initiated against stream S. At 206, the control plane generates a first transaction segment (T1) and a second transaction segment (T2) corresponding to segments S1 and S2, respectively. In some embodiments, an increase in workload is detected that requires scaling. At 208, epoch 2 is triggered that scales the second segment into a third segment (S3) and a fourth segment (S4). At 210, during the operation of the system, a commit command is received to end transaction. To execute the commit command, according to an embodiment, at 212, the system executes a rolling data stream transaction procedure.

Figure 3:
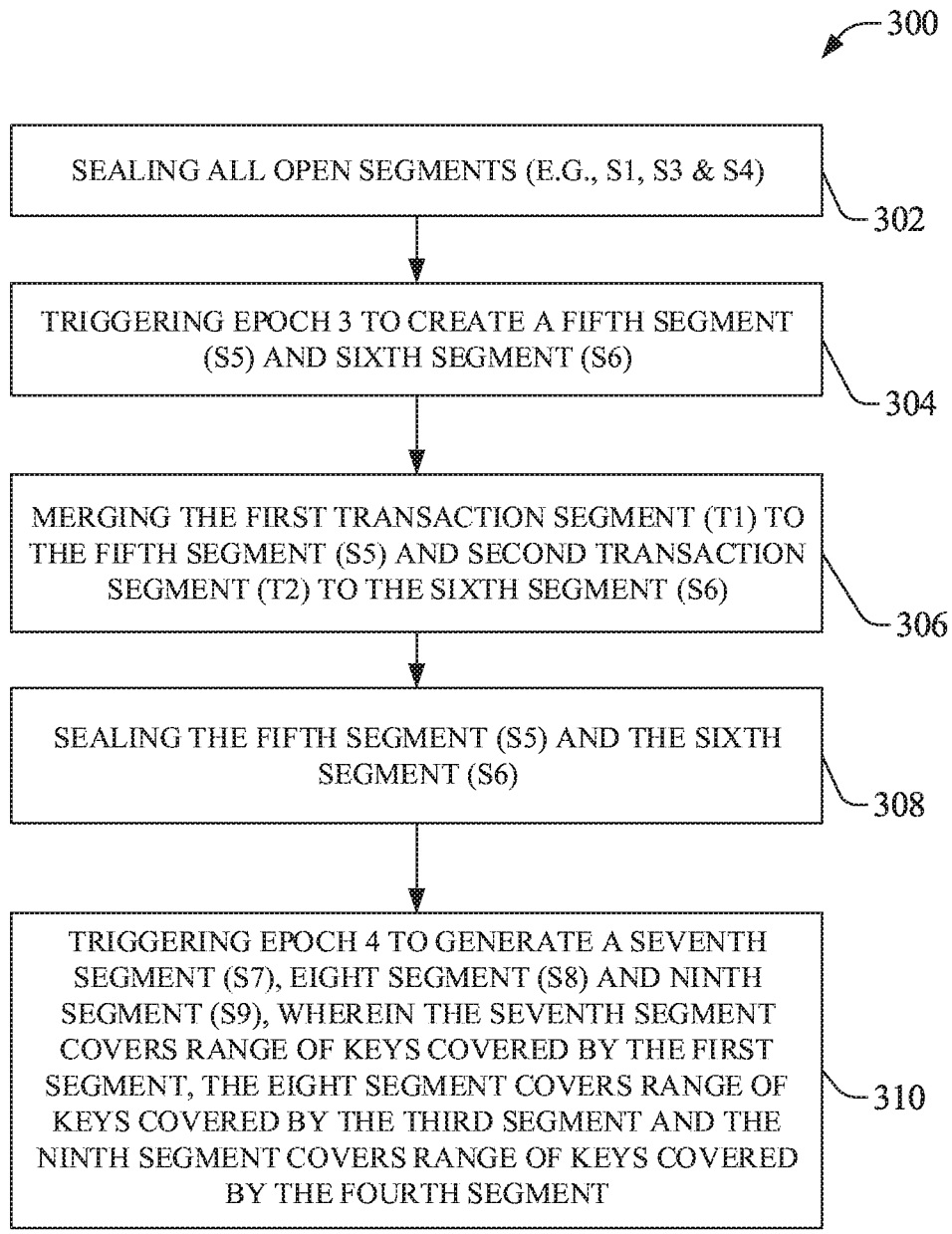
FIG. 3 illustrates flow diagram of an example, non-limiting rolling data stream transaction procedure 300 that facilitates processing continuously generated data in accordance with one or more embodiments described herein.

FIG. 3 illustrates a flow diagram of an example, non-limiting rolling data stream transaction procedure 300 that facilitates processing continuously generated data in accordance with one or more embodiments described herein. Upon receiving a commit command for a transaction that started in one epoch while in second epoch with a scaling event, at 302, the flow depicts sealing all open segments (e.g., S1, S3 & S4). At 304, the flow depicts triggering epoch 3 to create a fifth segment (S5) and sixth segment (S6). At 306, the flow depicts merging the first transaction segment (T1) to the fifth segment (S5) and second transaction segment (T2) to the sixth segment (S6). At 308, the flow depicts sealing the fifth segment (S5) and the sixth segment (S6). At 310, the flow depicts triggering epoch 4 to generate a seventh segment (S7), eighth segment (S8) and ninth segment (S9), wherein the seventh segment covers the range of keys covered by the first segment, the eight segment covers range of keys covered by the third segment and the ninth segment covers range of keys covered by the fourth segment. The advantage of this solution is that it enables applications to begin a transaction and commit it at any time. In the event the transaction aborts, the transaction segments are discarded (e.g., not merged).

Figure 4:
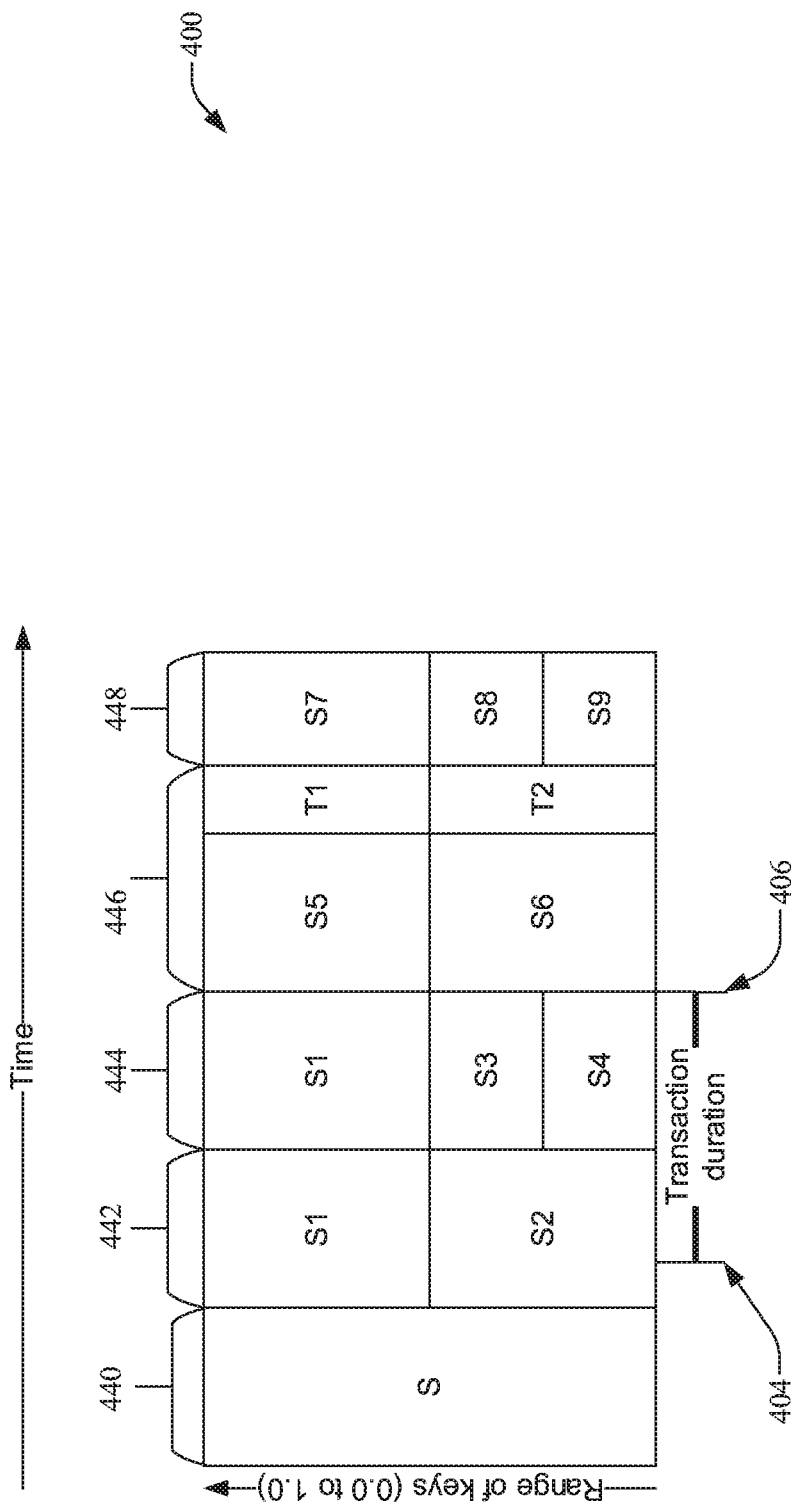
FIG. 4 illustrates a diagram of an example, non-limiting system 400 that facilitates processing continuously generated data using a rolling transaction procedure in accordance with one or more embodiments described herein.

FIG. 4 illustrates a diagram of an example, non-limiting system 400 that facilitates processing continuously generated data using a rolling transaction procedure in accordance with one or more embodiments described herein. As an example, at epoch 0 440, depicted is a stream (S). At epoch 1 442 the stream (S) is segmented into two segments, a first segment (S1) and a second segment (S2). Also, during epoch 1 and illustrated at 404, a transaction is initiated, wherein the control plane creates transaction segments, a first transaction segment (T1) and a second transaction segment (T2) that correspond to segments S1 and S2, respectively. A scaling event occurs that scales segment S2, whereby at epoch 2 444, segment S2 if further segmented into third segment (S3) and fourth segment (S4). Also, during epoch 2 444, the application commits the transaction at 406. In some embodiments, to execute the commit, the control plane seals segments (e.g., seals segments S1, S2 and S3). At epoch 446, the control plane creates new segments, a fifth segment (S5) and a sixth segment (S6), wherein the fifth segment (S5) corresponds to the first segment S1 and sixth segment S6 corresponds to the third segment S3 and fourth segment S4. Also, during epoch 446, the first transaction segment (T1) is merged into to the fifth segment (S5) and second transaction segment (T2) merged into to the sixth segment (S6). Upon merging the transaction segments T1 and T2, the control plane seals the segments (e.g., seals the fifth segment S5 and sixth segment S6). At epoch 4 448, the control plane creates a seventh segment (S7), an eighth segment (S8), and a ninth segment (S9), wherein the seventh segment S7 covers range of keys covered by the first segment S1, the eight segment S8 covers range of keys covered by the third segment S3 and the ninth segment S9 covers range of keys covered by the fourth segment S4.

Figure 5:
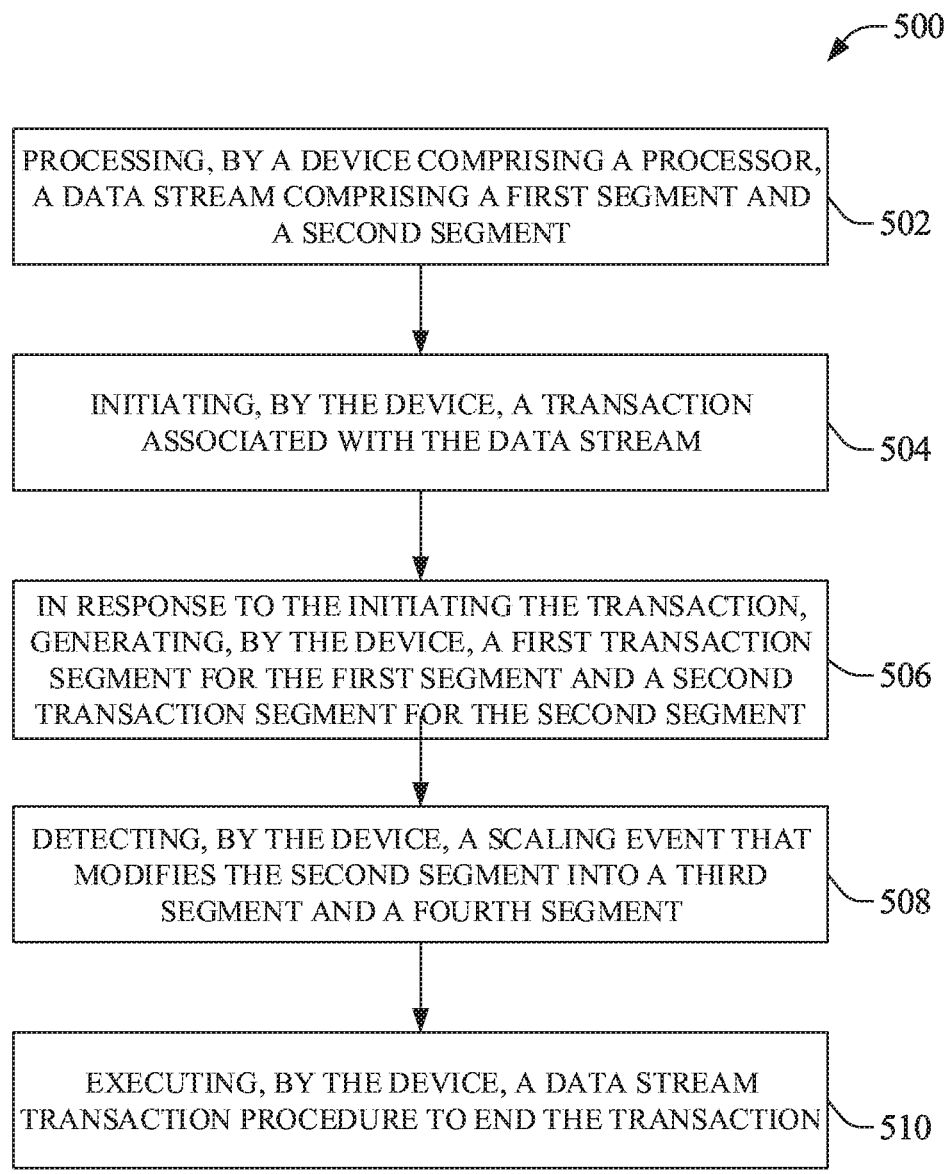
FIG. 5 depicts a diagram of an example, non-limiting computer implemented method that facilitates processing continuously generated data using a rolling transaction procedure in accordance with one or more embodiments described herein.

FIG. 5 depicts a diagram of an example, non-limiting computer implemented method that facilitates processing continuously generated data using a rolling transaction procedure in accordance with one or more embodiments described herein. In some examples, flow diagram 500 can be implemented by operating environment 1000 described below. It can be appreciated that the operations of flow diagram 500 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts processing, by a device comprising a processor, a data stream comprising a first segment and a second segment. Operation 504 depicts initiating, by the device, a transaction associated with the data stream. Operation 506 depicts in response to the initiating the transaction, generating, by the device, a first transaction segment for the first segment and a second transaction segment for the second segment. Operation 508 depicts detecting, by the device, a scaling event that modifies the second segment into a third segment and a fourth segment. Operation 510 depicts executing, by the device, a data stream transaction procedure to end the transaction.

Figure 6:
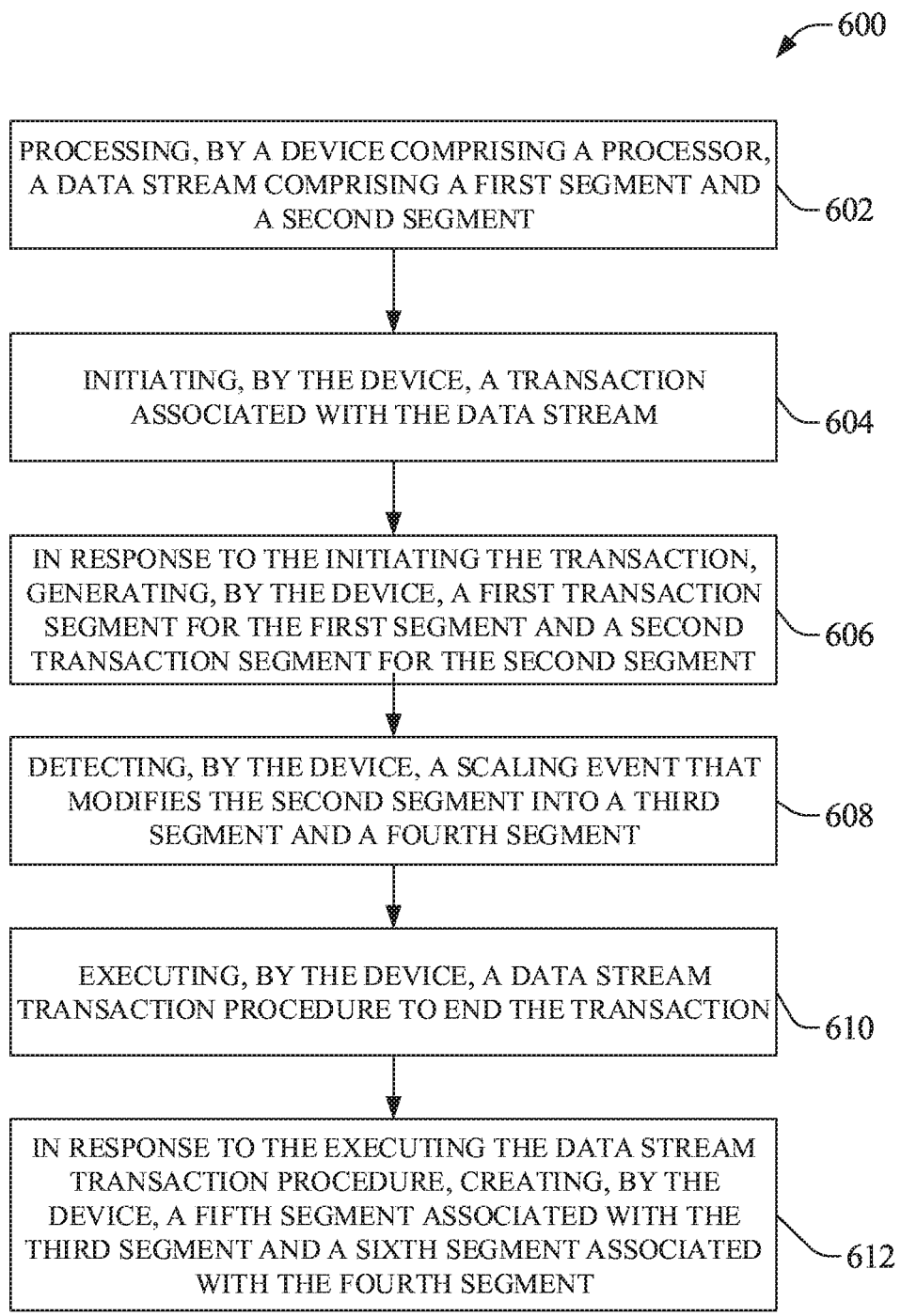
FIG. 6 depicts a diagram of an example, non-limiting computer implemented method that facilitates processing continuously generated data using a rolling transaction procedure in accordance with one or more embodiments described herein.

FIG. 6 depicts a diagram of an example, non-limiting computer implemented method that facilitates processing continuously generated data using a rolling transaction procedure in accordance with one or more embodiments described herein. In some examples, flow diagram 600 can be implemented by operating environment 1000 described below. It can be appreciated that the operations of flow diagram 600 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts processing, by a device comprising a processor, a data stream comprising a first segment and a second segment. Operation 604 depicts initiating, by the device, a transaction associated with the data stream. Operation 606 depicts in response to the initiating the transaction, generating, by the device, a first transaction segment for the first segment and a second transaction segment for the second segment. Operation 608 depicts detecting, by the device, a scaling event that modifies the second segment into a third segment and a fourth segment. Operation 610 depicts executing, by the device, a data stream transaction procedure to end the transaction. Operation 612 depicts in response to the executing the data stream transaction procedure, creating, by the device, a fifth segment associated with the first segment and a sixth segment associated with the third segment and the fourth segment.

Figure 7:
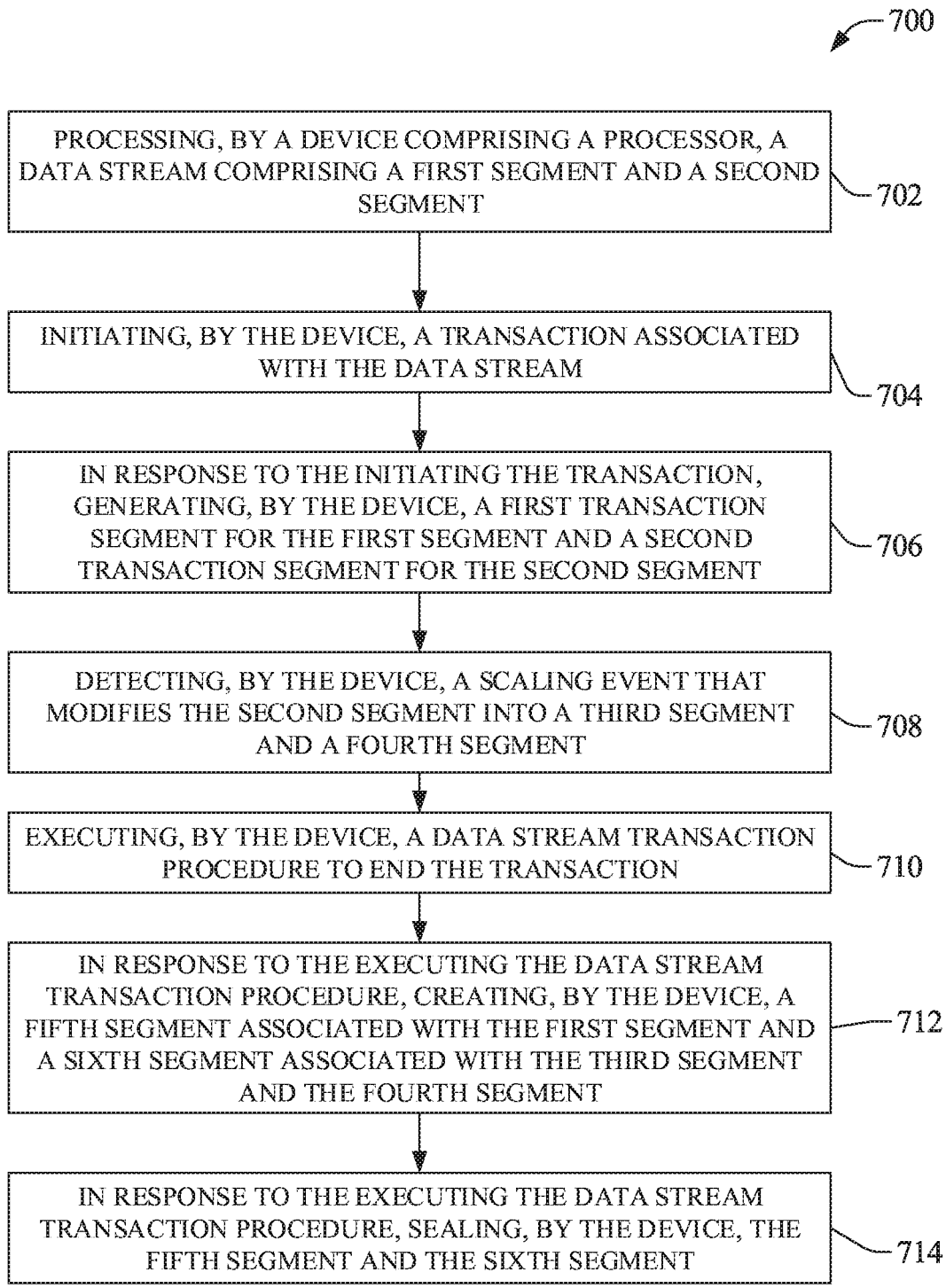
FIG. 7 depicts a diagram of an example, non-limiting computer implemented method that facilitates processing continuously generated data using a rolling transaction procedure in accordance with one or more embodiments described herein.

FIG. 7 depicts a diagram of an example, non-limiting computer implemented method that facilitates processing continuously generated data using a rolling transaction procedure in accordance with one or more embodiments described herein. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts processing, by a device comprising a processor, a data stream comprising a first segment and a second segment. Operation 704 depicts initiating, by the device, a transaction associated with the data stream. Operation 706 depicts in response to the initiating the transaction, generating, by the device, a first transaction segment for the first segment and a second transaction segment for the second segment. Operation 708 depicts detecting, by the device, a scaling event that modifies the second segment into a third segment and a fourth segment. Operation 710 depicts executing, by the device, a data stream transaction procedure to end the transaction. Operation 712 depicts in response to the executing the data stream transaction procedure, creating, by the device, a fifth segment associated with the first segment and a sixth segment associated with the third segment and the fourth segment. Operation 714 depicts in response to the executing the data stream transaction procedure, sealing, by the device, the fifth segment and the sixth segment.

Figure 8:
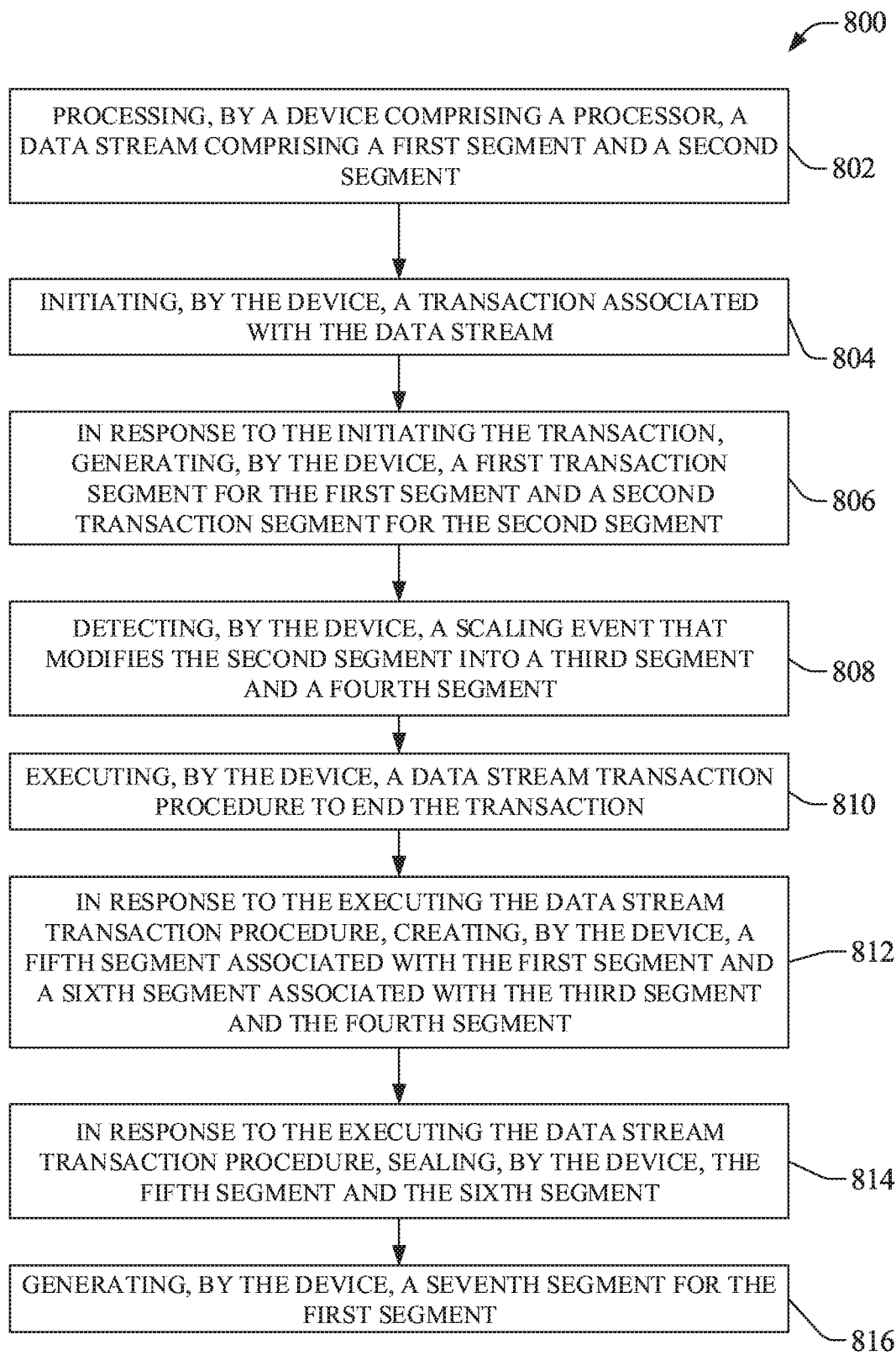
FIG. 8 depicts a diagram of an example, non-limiting computer implemented method that facilitates processing continuously generated data using a rolling transaction procedure in accordance with one or more embodiments described herein.

FIG. 8 depicts a diagram of an example, non-limiting computer implemented method that facilitates processing continuously generated data using a rolling transaction procedure in accordance with one or more embodiments described herein. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts processing, by a device comprising a processor, a data stream comprising a first segment and a second segment. Operation 804 depicts initiating, by the device, a transaction associated with the data stream. Operation 806 depicts in response to the initiating the transaction, generating, by the device, a first transaction segment for the first segment and a second transaction segment for the second segment. Operation 808 depicts detecting, by the device, a scaling event that modifies the second segment into a third segment and a fourth segment. Operation 810 depicts executing, by the device, a data stream transaction procedure to end the transaction. Operation 812 depicts in response to the executing the data stream transaction procedure, creating, by the device, a fifth segment associated with the first segment and a sixth segment associated with the third segment and the fourth segment. Operation 814 depicts in response to the executing the data stream transaction procedure, sealing, by the device, the fifth segment and the sixth segment. Operation 816 depicts generating, by the device, a seventh segment for the first segment.

Figure 9:
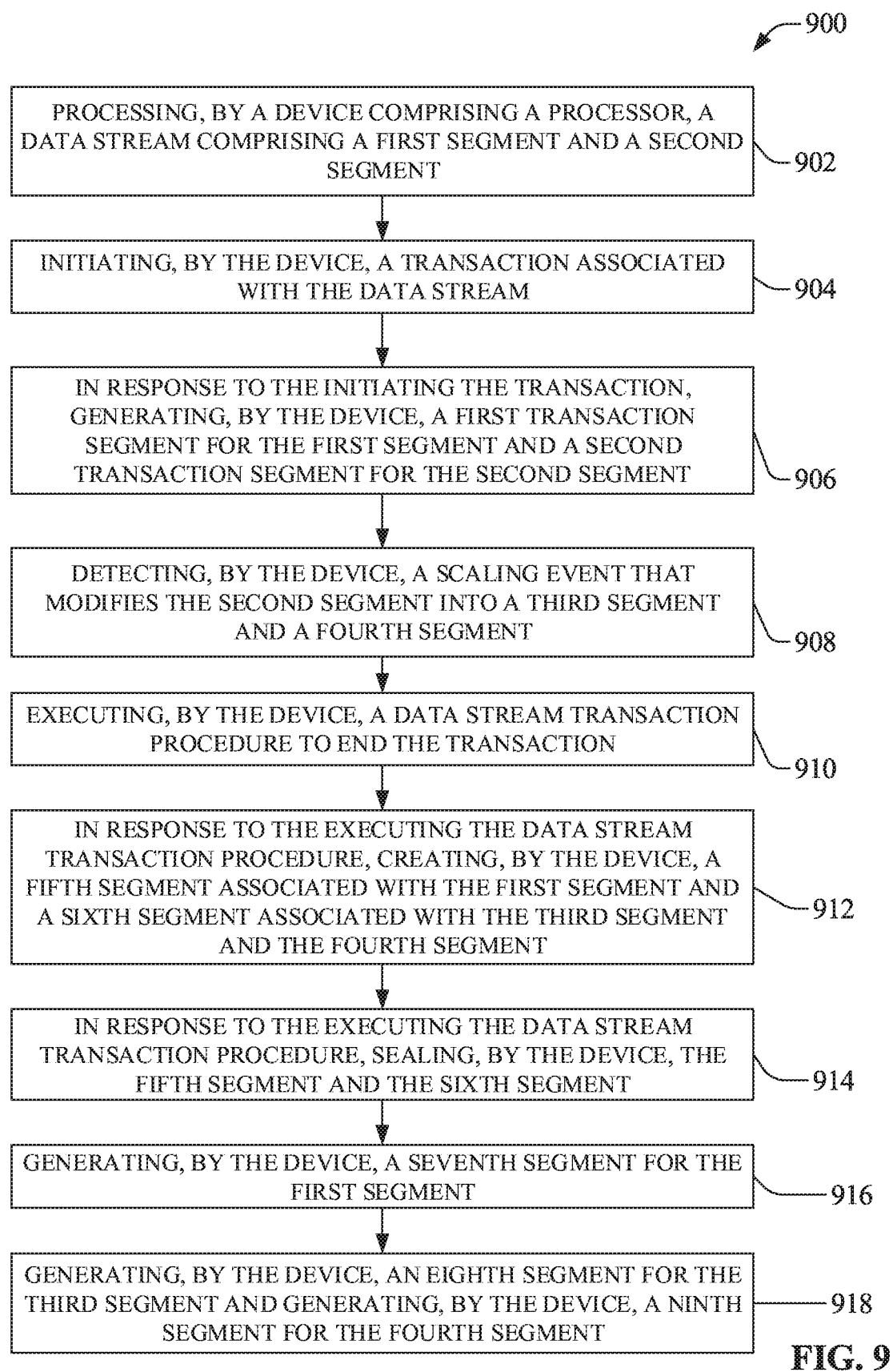
FIG. 9 depicts a diagram of an example, non-limiting computer implemented method that facilitates processing continuously generated data using a rolling transaction procedure in accordance with one or more embodiments described herein.

FIG. 9 depicts a diagram of an example, non-limiting computer implemented method that facilitates processing continuously generated data using a rolling transaction procedure in accordance with one or more embodiments described herein. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts processing, by a device comprising a processor, a data stream comprising a first segment and a second segment. Operation 904 depicts initiating, by the device, a transaction associated with the data stream. Operation 906 depicts in response to the initiating the transaction, generating, by the device, a first transaction segment for the first segment and a second transaction segment for the second segment. Operation 908 depicts detecting, by the device, a scaling event that modifies the second segment into a third segment and a fourth segment. Operation 910 depicts executing, by the device, a data stream transaction procedure to end the transaction. Operation 912 depicts in response to the executing the data stream transaction procedure, creating, by the device, a fifth segment associated with the first segment and a sixth segment associated with the third segment and the fourth segment. Operation 914 depicts in response to the executing the data stream transaction procedure, sealing, by the device, the fifth segment and the sixth segment. Operation 916 depicts generating, by the device, a seventh segment for the first segment. Operation 918 depicts generating, by the device, an eighth segment for the third segment and generating, by the device, a ninth segment for the fourth segment.

Figure 10:
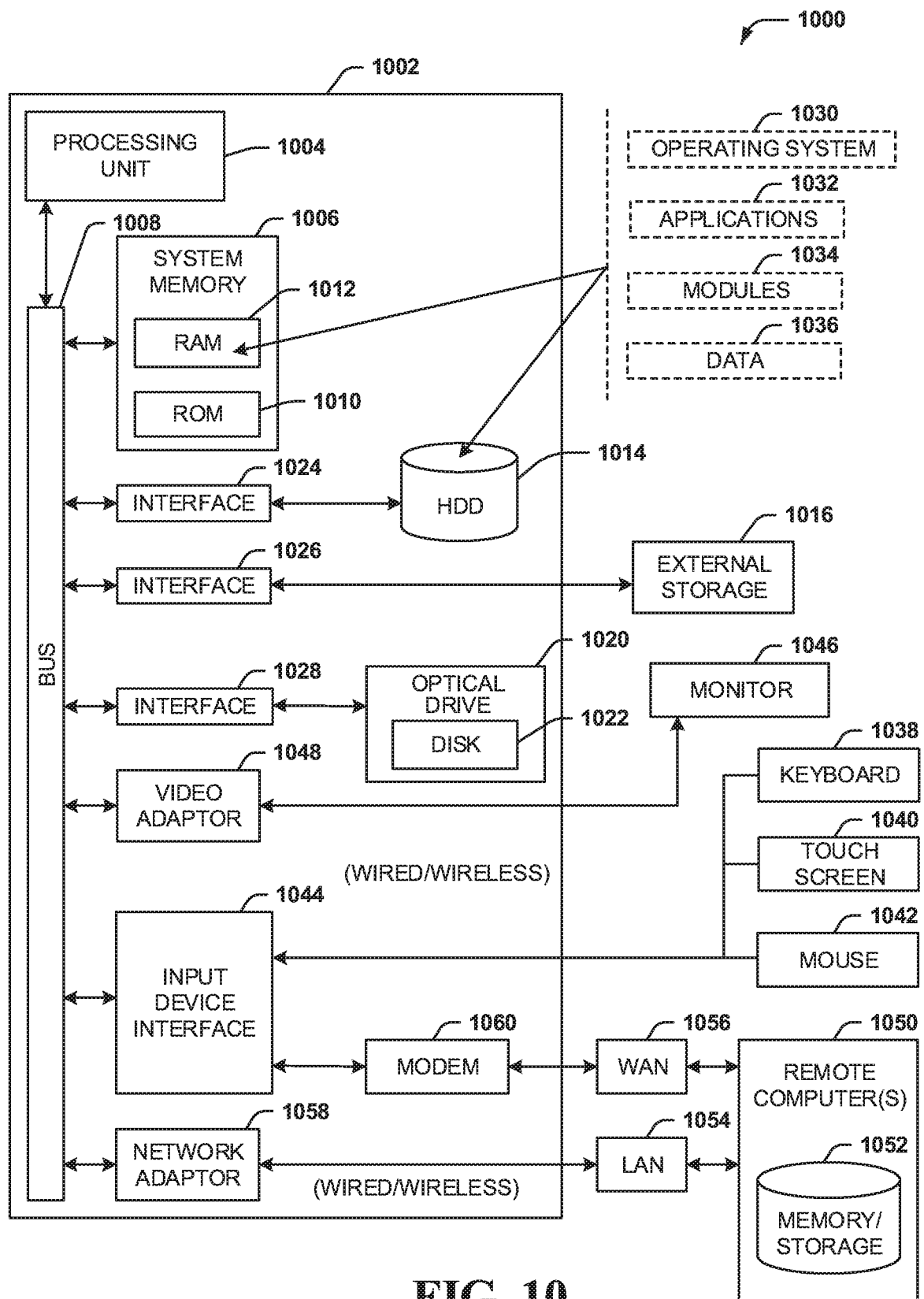
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server and/or communication device.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
    a processor; and
    a memory that stores executable instructions that, when executed by the processor, facilitate performance of operations, comprising:
        processing a data stream comprising a first segment of a main stream and a second segment of the main stream;

starting a transaction associated with the data stream;

in response to the starting the transaction, creating a first transaction segment associated with the first segment and a second transaction segment associated with the second segment, wherein the first transaction segment and the second transaction segment are configured to be merged to segments of the main stream upon a call to commit the transaction;

detecting a scaling event that modifies the second segment into a third segment of the main stream and a fourth segment of the main stream; and executing a data stream transaction procedure to end the transaction.

2. The system of claim 1, wherein the operations further comprise:

in response to the executing the data stream transaction procedure, creating a fifth segment of the main stream associated with the first segment and a sixth segment of the main stream associated with the third segment and the fourth segment.

3. The system of claim 2, wherein the operations further comprise:

in response to the executing the data stream transaction procedure, merging the first transaction segment to the fifth segment and merging the second transaction segment to the sixth segment and sealing the fifth segment and the sixth segment.

4. The system of claim 2, wherein the operations further comprise:

creating a seventh segment of the main stream associated with the first segment.

5. The system of claim 4, wherein the operations further comprise:

creating an eighth segment of the main stream associated with the third segment.

6. The system of claim 5, wherein the operations further comprise:

creating a ninth segment of the main stream associated with the fourth segment.

7. The system of claim 1, wherein the scaling event is initiated as result of a data traffic threshold value being determined to have satisfied a function with respect to a traffic threshold.

8. The system of claim 1, wherein the executing the data stream transaction procedure is in response to ending the transaction after the scaling the first segment.

9. A method, comprising:

processing, by a device comprising a processor, a data stream comprising a first segment of a main stream and a second segment of the main stream;

initiating, by the device, a transaction associated with the data stream;

in response to the initiating the transaction, generating, by the device, a first transaction segment for the first segment and a second transaction segment for the second segment, wherein the first transaction segment and the second transaction segment are configured to be merged to segments of the main stream upon a call to commit the transaction;

detecting, by the device, a scaling event that modifies the second segment into a third segment of the main stream and a fourth segment of the main stream; and executing, by the device, a data stream transaction procedure to end the transaction.

10. The method of claim 9, further comprising:

in response to the executing the data stream transaction procedure, creating, by the device, a fifth segment of the main stream associated with the first segment and a sixth segment of the main stream associated with the third segment and the fourth segment.

11. The method of claim 10, further comprising:

in response to the executing the data stream transaction procedure, merging the first transaction segment to the fifth segment and merging the second transaction segment to the sixth segment and sealing, by the device, the fifth segment and the sixth segment.

12. The method of claim 10, further comprising:

generating, by the device, a seventh segment of the main stream for the first segment.

13. The method of claim 12, further comprising:

generating, by the device, an eighth segment of the main stream for the third segment; and generating, by the device, a ninth segment of the main stream for the fourth segment.

14. The method of claim 9, wherein the scaling event is initiated as result of a data traffic threshold value reaching above a traffic threshold.

15. The method of claim 9, wherein the executing the data stream transaction procedure is in response to ending the transaction after the scaling the first segment.

16. A machine-readable storage medium, comprising executable instructions that, when executed by a processor, facilitate performance of operations, comprising:

processing a data stream comprising a first segment of a main stream and a second segment of the main stream;

starting a transaction associated with the data stream;

in response to the starting the transaction, creating a first transaction segment associated with the first segment and a second transaction segment associated with the second segment wherein the first transaction segment and the second transaction segment are configured to be merged to segments of the main stream upon a call to commit the transaction;

detecting a scaling event that modifies the second segment into a third segment of the main stream and a fourth segment of the main stream; and executing a commit request for the transaction, wherein the executing the commit request comprises executing a data stream transaction procedure to end the transaction.

17. The machine-readable storage medium of claim 16, wherein the operations further comprise:

in response to the executing the data stream transaction procedure, creating a fifth segment of the main stream associated with the first segment and a sixth segment of the main stream associated with the third segment and the fourth segment; and in response to the executing the data stream transaction procedure, merging the first transaction segment to the fifth segment and merging the second transaction segment to the sixth segment and sealing the fifth segment and the sixth segment.

18. The machine-readable storage medium of claim 17, wherein the operations further comprise:

generating a seventh segment of the main stream for the first segment;

generating an eighth segment of the main stream for the third segment; and generating a ninth segment of the main stream for the fourth segment.

19. The machine-readable storage medium of claim 16, wherein the scaling event is initiated as result of a data traffic threshold value being determined to be above a traffic threshold.

20. The machine-readable storage medium of claim 16, wherein the executing the data stream transaction procedure is in response to ending the transaction after the scaling of the first segment.

\* \* \* \* \*